Patented Mar. 19, 1946

2,396,713

UNITED STATES PATENT OFFICE 2,396,713

COPOLYMERS OF HALOGENATED ETHYLENES

Elmore Louis Martin, Wilmington, Del., assignor to E. I. du Pont de Nemours & Company, Wilmington, Del., a corporation of Delaware No Drawing. Application June 12, 1944, Serial No. 539,985

9 Claims. (Cl. 260—80)

This invention relates to polymeric materials and more particularly to polymers obtained from halogenated ethylenes.

This invention has as an object the production of new and useful compositions of matter. A further object is the preparation of valuable high molecular weight polymers comprising tetrafluoroethylene. A still further object is the preparation of polymers comprising tetrafluoroethylene having greater solubility in organic solvents and improved workability. Other objects will appear hereinafter.

These objects are accomplished by the following inventions wherein a mixture of tetrafluoroethylene, a perchlorofluoroethylene containing at least 2 fluorine atoms and a hydrogen-containing halogenated ethylene is polymerized as more fully described hereinafter.

The invention is illustrated by the following examples wherein parts are by weight.

Example I

A stainless steel high pressure shaker reactor is charged with 200 parts of deoxygenated water and 0.3 part of benzoyl peroxide. The reactor is closed, evacuated, cooled in a solid carbon dioxide/methanol mixture, and is then further charged with 20 parts of chlorotrifluoroethylene, 70 parts of vinyl fluoride and 15 parts of tetrafluoroethylene. The reactor is agitated and heated to 80° C. while maintaining an internal pressure within the range of 3000–3200 lbs./sq. in. by the periodic injection into the reactor of deoxygenated water. The sum of the individual pressure drops during a heating period of 10.1 hours is 3300 lbs./sq. in. The reactor is cooled to room temperature, the unreacted portion of the gaseous monomers is bled off and the contents of the reaction tube are discharged. There is obtained 36 parts of a copolymer which contains 50.2% fluorine and 5.73% chlorine which corresponds to a chlorotrifluoroethylene/tetrafluoroethylene/vinyl fluoride copolymer having a chlorotrifluoroethylene content of 19%, a tetrafluoroethylene content of 21%, and a vinyl fluoride content of 60%. This corresponds to a mol ratio of chlorotrifluoroethylene/tetrafluoroethylene/vinyl fluoride of 1:1.3:7.9. Films cast from an acetone solution (25% copolymer), have tensile strengths of 5340 lbs./sq. in. at an elongation of 435%, a modulus of elasticity of $0.137 \times 10^6$ lbs./sq. in., a tack temperature (the temperature at which the film shows a tendency to stick to a highly polished surface) of 125–130° C. and a temperature of zero tenacity of 153° C. The copolymer is nonflammable and is soluble in acetone, methyl ethyl ketone, ethyl acetate, and halogenated hydrocarbons. It is insoluble in alcohol, ether, and aliphatic and aromatic hydrocarbons.

A film of the above type cast from an acetone solution and having a thickness of .005 in. is given a substratum coating by passing through a subbing solution comprising a dispersion of gelatin in acetone then, after drying, it is coated with a light sensitive gelatin-silver iodobromide emulsion. This film is found to have high dimensional stability toward photographic processing. The water absorption of the film is 0.64% after soaking for 24 hrs. as compared to a value of 3.8% for cellulose acetate butyrate, a standard film base. This makes the film of particular value in aerial photography, map making and lithographic printing where present film bases are unsatisfactory. When these light sensitive elements are slit and perforated, they are particularly desirable in producing motion pictures as the high dimensional stability and toughness lead to a greater resistance to wear on projection than is obtainable with the present cellulosic film supports. Films of this type are particularly useful in color photography since the support is of a high degree of stability and does not release harmful acidic decomposition products which cause the dyes to fade as is the case with cellulose ester supports.

In order to facilitate ready selection of preferred copolymers of this invention for the particular use contemplated, the following table which shows the physical properties of a number of chlorotrifluoroethylene/tetrafluoroethylene/vinyl fluoride copolymers is inserted herein.

acetone solution (25% copolymer) have a tack temperature of 105–110° C., a temperature of zero tenacity of 143° C., a modulus of elasticity of

| Composition of copolymer | | | Tack temperature | Temperature of zero ten. | Tenacity | Elongation | Modulus of elasticity ×10⁶ | Clarity of films |
|---|---|---|---|---|---|---|---|---|
| Tetrafluoroethylene | Chlorotrifluoroethylene | Vinyl fluoride | | | | | | |
| Per cent | Per cent | Per cent | °C. | °C. | Lbs./sq. in. | Per cent | Lbs./sq. in. | |
| 12 | 44 | 44 | 110 | 165 | 7,850 | 300 | 0.122 | Excellent. |
| 13 | 65 | 22 | 40 | 88 | 4,400 | 165 | 0.03 | Do. |
| 18 | 27 | 55 | 105 | 159 | 8,100 | 420 | 0.174 | Good. |
| 18 | 54 | 28 | 65 | 98 | 3,730 | 255 | 0.035 | Do. |
| 21 | 19 | 60 | 130 | 153 | 5,340 | 435 | 0.137 | Do. |
| 21 | 19 | 60 | 145 | 165 | 6,570 | 470 | 0.155 | Excellent. |
| 22 | 50 | 28 | 115 | 129 | 5,450 | 270 | 0.090 | Good. |
| 26 | 34 | 40 | 120 | 125 | 4,250 | 270 | 0.129 | Excellent. |
| 30 | 17 | 53 | 150 | 160 | 3,900 | 580 | 0.091 | Hazy. |
| 33 | 28 | 39 | 110 | 130 | 5,450 | 350 | 0.105 | Excellent. |
| 36 | 18 | 46 | ----- | 190 | 8,850 | 430 | 0.128 | Fair. |
| 43 | 17 | 40 | 145 | 170 | 6,500 | 400 | 0.130 | Excellent. |
| 53 | 24 | 23 | 135 | 155 | 6,620 | 425 | 0.113 | Good. |
| 59 | 11 | 30 | 140 | 184 | 6,400 | 600 | 0.103 | Hazy. |
| 77 | 12 | 11 | 150 | 188 | 3,500 | 470 | 0.139 | Do. |

*Example II*

A stainless steel pressure reactor is charged with 200 parts of deoxygenated water and 0.3 part of benzoyl peroxide. The reactor is closed, evacuated, cooled in a solid carbon dioxide/methanol mixture, and it is further charged with 75 parts of vinyl chloride, 20 parts of chlorotrifluoroethylene and 50 parts of tetrafluoroethylene. The reactor is then agitated and heated to 80° C., the pressure being maintained in the range of 1500–2000 lbs./sq. in. by the periodic injection of deoxygenated water. After heating for 9.5 hours the sum of the pressure drops is 2100 lbs./sq. in. The reactor is then cooled and discharged. There is obtained a quantitative yield of copolymer containing 18% chlorotrifluoroethylene, 14% of tetrafluoroethylene and 68% vinyl chloride. Films cast from a 25% solution in acetone had a tensile strength of 5370 lbs./sq. in., a modulus of elasticity of 0.21×10⁶ lbs./sq. in., a zero tenacity of 77° C. and a tack temperature of 60° C.

*Example III*

A stainless steel pressure reactor is swept with oxygen-free nitrogen and then charged with 200 parts of deoxygenated water and 0.4 part of benzoyl peroxide. The reactor is closed, evacuated, cooled in a solid carbon dioxide/methanol mixture and is then further charged with 30 parts of 1,2-dichloro-1,2-difluoroethylene, 40 parts of vinyl fluoride and 30 parts of tetrafluoroethylene. The reactor is agitated and heated to 80° C. The pressure within the reactor is then raised to 2800 lbs./sq. in. by the injection of additional deoxygenated water. The temperature is maintained at 80° C. and additional water is introduced to maintain the pressure within the range of 2650–2800 lbs./sq. in. The sum of the individual pressure drops during 9 hours reaction time is 3150 lbs./sq. in. The reaction vessel is cooled to room temperature, the unreacted portion of the gaseous monomers is bled off and the contents of the tube are discharged. There is obtained 40 parts of a copolymer which contains 10.0% chlorine and 57.7% fluorine which corresponds to a tetrafluoroethylene/1,2-dichloro-1,2-difluoroethylene/vinyl fluoride copolymer having a tetrafluoroethylene content of 56%, a 1,2-dichloro-1,2-difluoroethylene content of 19% and a vinyl fluoride content of 25%. This corresponds to a mol ratio of tetrafluoroethylene / dichlorodifluoroethylene / vinyl fluoride of 3.97:1:3.93. Clear films cast from an acetone solution (25% copolymer) have a tack temperature of 105–110° C., a temperature of zero tenacity of 143° C., a modulus of elasticity of 0.095×10⁶ lbs./sq. in. and a tensile strength of 4680 lbs./sq. in. at an elongation of 375%.

A wide variety of compounds are available for the preparation of the polymers described herein. Examples of perchlorofluoroethylenes containing at least two fluorine atoms in addition to chlorotrifluoroethylene and 1,2-dichloro-1,2-difluoroethylene include 1,1-dichloro-2,2-difluoroethylene and bromotrifluoroethylene. Hydrogen-containing halogenated ethylenes in addition to vinyl chloride and vinyl fluoride include vinyl bromide, 1,1-dichloroethylene, 1,1-difluoroethylene, 1-chloro-1-fluoroethylene, 1,1-difluoro-2-chloroethylene and trifluoroethylene.

It is essential to the securing of the desired balance between preservation of the most desirable characteristics of solubility, stiffness, melting point and clarity, and sacrifice of the said four properties or any of them, that each of the copolymer ingredients be present in the composition to the extent of at least 5%. Based on solubility, compositions containing 5–75% of tetrafluoroethylene, 5–75% of the perchlorofluoroethylene and 10–80% of the hydrogen-containing halogenated ethylene are preferred. Where stiffness and solubility are factors, compositions containing 10–55% of tetrafluoroethylene, 5–25% of the perchlorofluoroethylene and 30–75% of the hydrogen-containing halogenated ethylene are particularly suitable. For applications where tack temperature, stiffness and clarity are of first importance, compositions containing 20–45% of tetrafluoroethylene, 10–20% of the perchlorofluoroethylene and 40–65% of the hydrogen-containing halogenated ethylenes are preferred inasmuch as compositions containing higher ratios of tetrafluoroethylene yield films having lower stiffness and compositions containing more than 35% of the perchlorofluoroethylene are generally lower softening and less stiff whereas those containing more than 35% of the hydrogen-containing halogenated ethylenes are less soluble.

Although the examples illustrate the polymerization of the monomers in the presence of water, it is possible to carry out the reaction in an organic solvent instead of water. In general, it is preferred to carry out the polymerization in the presence of water or water-organic solvent mixtures inasmuch as better results can be obtained since when organic solvents alone are used, the products are in general characterized by lower molecular weight.

The catalysts used in the practice of this invention are peroxy compounds, i. e., those compounds which contain a —O—O— linkage. Examples of such catalysts are diacyl peroxides, such as benzoyl peroxide and lauroyl peroxide, dialkyl peroxides such as diethyl peroxide, and inorganic peroxy compounds such as ammonium persulfate, potassium persulfate, potassium percarbonate, potassium perphosphate, sodium perborate and hydrogen peroxide.

The polymerization is conducted generally at temperatures within the range of 40–200° C., depending upon the type of catalyst used. With diacyl peroxide catalysts, temperatures ranging from 60–120° C.; with persulfate catalysts 30–100° C., and with dialkyl peroxide catalysts, 100–150° C. are generally used. The polymerization can be carried out at pressures above atmospheric, in general within the range of 500–5000 lbs. per sq. in. and preferably within the range of 1500–4000 lbs./sq. in.

The products of this invention are characterized by improved solubility and clarity. They are further characterized by having the valuable combination of properties which include good tensile strength, relatively high softening temperature, excellent clarity, high modulus of elasticity, low water absorption, and nonflammability. The copolymers of this invention are therefore particularly suitable for use as a base for photographic and X-ray films and in coating compositions, wrapping films and industrial fibers. For many of these purposes the polymer may be combined with or prepared in the presence of plasticizers, stabilizers, fillers, pigments, dyes, softeners, natural resins or synthetic resins.

As many widely different embodiments of this invention may be made without departing from the spirit and scope thereof, it is to be understood that this invention is not to be limited to the specific embodiments thereof, except as defined in the appended claims.

I claim:

1. A composition of matter comprising the copolymerization product of a composition comprising tetrafluoroethylene, a perchlorofluoroethylene containing at least two fluorine atoms, and a hydrogen-containing halogenated ethylene, each of said reactants being present in amount, based on the weight of said reactants, of at least 5%.

2. A composition of matter comprising the copolymerization product of a composition comprising tetrafluoroethylene, chlorotrifluoroethylene, and a hydrogen-containing halogenated ethylene, each of said reactants being present in amount, based on the weight of said reactants, of at least 5%.

3. A composition of matter comprising the copolymerization product of a composition comprising tetrafluoroethylene, chlorotrifluoroethylene, and a vinyl halide, each of said reactants being present in amount, based on the weight of said reactants, of at least 5%.

4. A self supporting film comprising the composition set forth in claim 1.

5. A process which comprises copolymerizing reactants comprising tetrafluoroethylene, a perchlorofluoroethylene containing at least two fluorine atoms and a hydrogen-containing halogenated ethylene by heating said reactants under superatmospheric pressure and at a temperature of from 40° C. to 200° C. in contact with a peroxy compound, each of said reactants being present, in amount based on the weight of said reactants, of at least 5%.

6. The composition set forth in claim 3 in which said vinyl halide is vinyl fluoride.

7. The composition set forth in claim 3 in which said vinyl halide is vinyl chloride.

8. The process set forth in claim 5 in which said hydrogen-containing halogenated ethylene is vinyl fluoride.

9. The process set forth in claim 5 in which said hydrogen-containing halogenated ethylene is vinyl chloride.

ELMORE LOUIS MARTIN.